United States Patent

Geisel

Patent Number: 5,925,159
Date of Patent: *Jul. 20, 1999

[54] PROCESS FOR DETERMINING THE WEIGHT OF FREE-FALLING MOLTEN GLASS GOBS

[76] Inventor: Hartmut Geisel, Bäckerstrasse 8, D-38678 Clausthal-Zellerfeld, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/860,619

[22] PCT Filed: Nov. 15, 1995

[86] PCT No.: PCT/DE95/01582

§ 371 Date: Jun. 11, 1997

§ 102(e) Date: Jun. 11, 1997

[87] PCT Pub. No.: WO96/18870

PCT Pub. Date: Jun. 20, 1996

Related U.S. Application Data

[30] Foreign Application Priority Data

Dec. 12, 1994 [DE] Germany .............................. 44 43 991

[51] Int. Cl.⁶ .................... C03B 7/00; G01G 9/00
[52] U.S. Cl. .................. 65/29.12; 65/29.16; 65/29.18; 65/127; 65/158; 65/164; 65/303
[58] Field of Search ................ 65/29.18, 29.12, 65/29.16, 127, 129, 158, 164, 303, 304, DIG. 13, 382; 324/452, 76.11, 76.74, 137, 144

[56] References Cited

U.S. PATENT DOCUMENTS

| | | |
|---|---|---|
| 3,846,107 | 11/1974 | Foster . |
| 4,165,975 | 8/1979 | Kwiatkowski et al. . |
| 4,205,973 | 6/1980 | Ryan . |
| 4,445,923 | 5/1984 | Shetterly . |
| 4,604,122 | 8/1986 | Keller ................................... 65/29.18 |
| 4,634,462 | 1/1987 | Fish et al. ............................ 65/29.18 |
| 4,708,729 | 11/1987 | Cardenas-Franco et al. . |

FOREIGN PATENT DOCUMENTS

| | | |
|---|---|---|
| 2440922 | 6/1980 | France . |
| 19 59 406 | 7/1970 | Germany . |
| 4143185 | 7/1993 | Germany . |
| 638613 | 9/1983 | Switzerland . |
| WO 96/18870 | 6/1996 | WIPO . |

OTHER PUBLICATIONS

Shaw, F., Measurement and Control, vol. 17, No. 10, "The Measurement of Gob Length and Weight During the Manufacture of Glass Bottles", pp. 380–382, Nov. 1984.

Primary Examiner—Steven P. Griffin
Attorney, Agent, or Firm—Michael J. Striker

[57] ABSTRACT

A process for determining a weight of free-falling molten glass gobs has the steps of providing an electromagnetic alternating field, passing a glass gob through the electromagnetic alternating field in a free fall, measuring resultant eddy current losses of the electromagnetic alternating field caused by the glass gob during passage through the electromagnetic alternating field, and determining a weight of the glass gob via the detected resultant eddy current losses.

2 Claims, 1 Drawing Sheet

PROCESS FOR DETERMINING THE WEIGHT OF FREE-FALLING MOLTEN GLASS GOBS

BACKGROUND OF THE INVENTION

The present invention relates to a process for determining the weight of free-falling molten glass gobs.

Modern glass vessel production machines process up to 200 gobs of glass per minute, which are delivered to the machines from the melt via a feeder system. An approximately constant weight of the glass gobs produced by a metering device is essential, since fluctuations in weight lead to articles of poorer quality or even to rejects. Even with a properly functioning metering device, however, fluctuations in weight cannot be avoided since the metering process is affected, among other factors, by the level of the glass melt in the melting tub and/or by temperature fluctuations of the melt. These fluctuations can amount to several grams per minute.

To keep the weights of the glass gobs within the allowable range, in a method known from the prior art the finished glass articles are weighed continuously at intervals of 5 to 15 minutes. Following each measurement, the metering device is then adjusted manually—if necessary. The weighed articles have to be thrown away after weighing, since they are damaged by being manipulated while still cooling down.

To automate this process, U.S. Pat. No. 3,846,107 proposes carrying out the weighing with electromechanical scales and supplying the ascertained weight to a controller as a measurement variable. By a comparison of set-point and actual values, an appropriate adjustment of the metering device is then done via the controller. This method allows determining the weight at the earliest after the article has been taken from the finished form, but usually not until much much later. This involves major mechanical effort and expense; the mechanism is vulnerable to malfunction and is subject to continuous wear. Moreover, in both this and the method described above, any reaction to fluctuations in weight occur only after a not-inconsiderable time lag.

This disadvantage is averted with the method of U.S. Pat. No. 4,205,973. Here, among other parameters, the volume and hence the weight of molten glass gobs free-falling in the feeder system of a glass container production line are determined. To that end, two line-scanning cameras are used, which detect the volume of the dropping glass gob slice by slice. Once all the data of one glass gob are available, its volume or weight is calculated via a computer.

In this method, the weight of the glass gobs produced is already determined early by comparison with the methods described earlier herein, so that better regulation of the metering device is possible. This advantage is bought at the cost of very major technological effort. Moreover, the cameras required are not especially well suited to the severe conditions of the glass melt, and hence much effort has to be expended for maintaining and caring for them.

German Published, Examined Patent Application DE-AS 19 59 406 describes a measurement probe operating by the eddy current principle. In one application, two of these measurement probes act as a weighing device. The weight of the specimen changes the spacing between the measurement probes and highly conductive slices associated with and located opposite them. In the measurement probe, this generates eddy current losses, which are proportional to this change in spacing and represent a standard for the weight of the specimen. Thus the probes function as distance meters.

SUMMARY OF THE INVENTION

The object of the present invention is therefore to furnish a process for determining the weight of free-falling molten glass gobs which requires only very slight technological effort and is suitable for the severe conditions in a glass melt. In particular, the fluctuations in weight of the glass gobs produced should be reduced to a minimum.

According to the invention, this object is attained by means of a process of the type referred to at the outset in that the molten glass gobs are passed through an electromagnetic alternating field, and the resultant eddy current losses are detected by measurement technology as a standard for the glass gobs weight.

The merit of the present invention resides in the recognition that the electrical conductivity of molten glass can be utilized to determine the weight of glass gobs. Taking this fundamental principle as the point of departure, the stated object can be attained by very simple means.

For instance, if the electromagnetic alternating field is generated by a coil with an applied alternating voltage, then the eddy currents generated in the glass gob as it drops through the alternating field cause a reduction in the alternating voltage at the coil. A measurement at this alternating voltage over the time that elapses as the glass gob passes through the alternating field makes it possible to draw a conclusion as to the dimensions of the glass gob and can thus be used to ascertain the volume or weight. The electromagnetic alternating field should advantageously be oriented in such a way relative to the path along which the glass gob drops that as much energy as possible, in the form of eddy currents, is extracted from the electrical alternating field on the passage of the glass gob, and that a conclusion can be drawn about the configuration of the glass gob.

A system based on the process of the invention is insensitive to soiling from dust, oil or water and to high ambient temperatures.

It is especially advantageous if the above-described fundamental process is incorporated into a production line for glass vessels. This is done in that the standard for the glass gob weight that is detectable via the effect of the eddy current losses is utilized to regulate the metering device, which is used to adjust the weight of the glass gob. To that end, the ascertained weight standard is supplied as a measurement variable to a closed control loop, by way of which an automatic adjustment of the metering device is effected if there is a deviation from the set-point standard.

As a result, as also in the method of U.S. Pat. No. 4,205,973, but by comparison with it using much simpler means, it becomes possible already early after the creation of the glass gobs to react to any fluctuations in weight that occur.

The present invention will be described in further detail below in terms of an exemplary embodiment.

DESCRIPTION OF THE PREFERRED EMBODIMENTS

Figure 1:
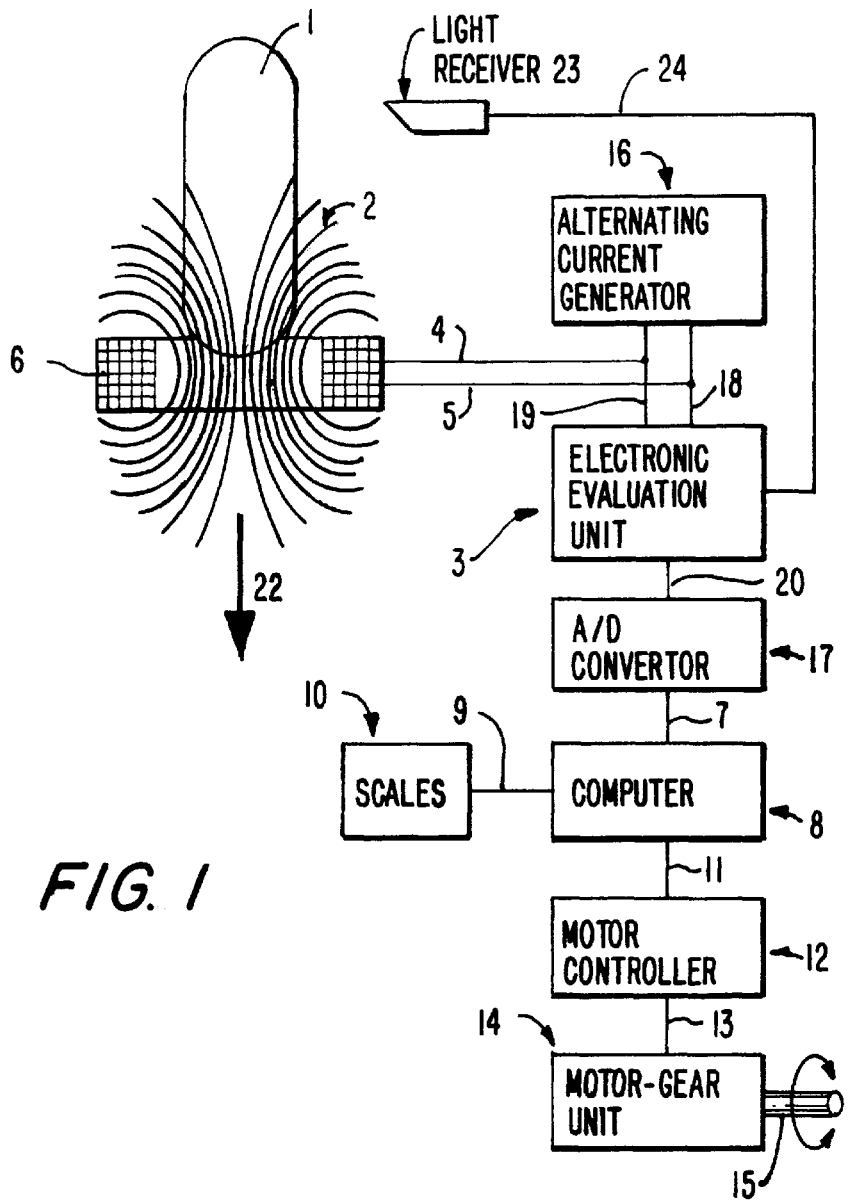
FIG. 1, a block diagram to illustrate the utilization of the glass gob weight, detectable via the effect of the eddy current losses, to regulate a metering device in a glass vessel production line, and FIG. 2, an analog signal, which is generated by the electronic evaluation unit when a glass gob moves past the electromagnetic alternating field.

Electromagnetic alternating field 2 required for performing the process is generated by means of a coil 6, which is disposed in the drop path 22 of glass gobs 1. Such drop paths 22 are present in glass vessel production lines directly downstream of the metering device, not shown, or at the transitions, also not shown, between the feeders and the glass molds and can be considered as locations for installing the coil 6.

An alternating current generator 16 supplies alternating current to the coil 6 via lines 18, 5 and 19, 4, and via these same lines, an electronic evaluation unit 3 is connected to the coil 6.

If a glass gob 1 now enters the range of the electromagnetic alternating field 2, this is detected from the heat radiation by means of a light receiver 23, which starts the electronic evaluation unit 3 via a line 24. As the glass gob 1 drops through the electromagnetic alternating field 2, eddy currents are generated in the glass gob 1 that extract energy from the electromagnetic alternating field 2. The voltage drop measurable by means of the energy extraction at the coil 6 is greater, the larger the mass of glass passing through the electromagnetic alternating field. The change in voltage is made available to the electronic evaluation unit 3 via the lines 4, 19 and 5, 18 and processed there.

Figure 2:
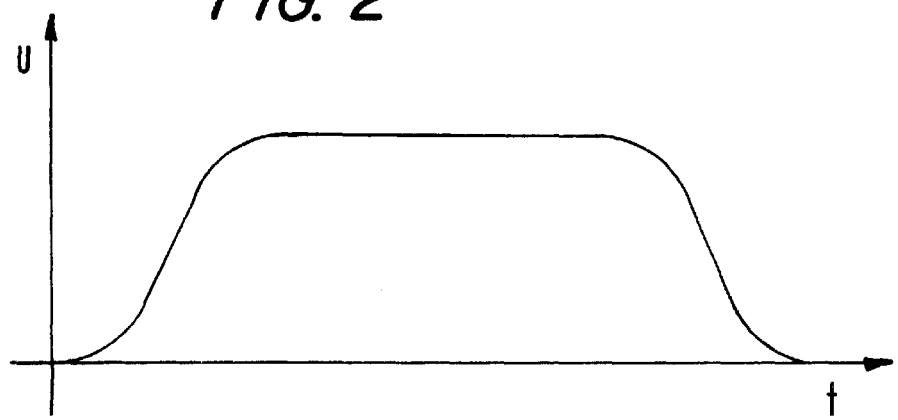

The output signal of the electronic evaluation unit 3 is shown in FIG. 2. Over the line 20, this signal reaches an analog/digital converter 17 and from there it passes over the line 7 to a computer 8. In the computer 8, the incoming signal is evaluated and associated with a weight of the glass gob 1. By weighing a finished article using the scales 10, the computer 8 receives an absolute weight indication via the data line 9, and this enables a later absolute association of the measured weight variables. After each measurement, the computer 8 compares the measured weight with a set-point weight. If differences occur, then an open-loop motor controller 12 is activated via a line 11. This controller communicates via a line 13 with a motor-gear unit 14, whose drive shaft 15 adjusts the metering device. The deviations in weight of subsequent glass gobs 1 are thus regulated to 0.

I claim:

1. A process for determining a weight of free-falling molten glass gobs, comprising the steps of providing an electromagnetic alternating field; passing a glass gob through the electromagnetic alternating field in a free fall; measuring resultant eddy current losses of the electromagnetic alternating field caused by the glass gob during passage of the glass gob through the electromagnetic alternating field; and determining a weight of the glass gob via the detected resultant eddy current losses.

2. A process as defined in claim 1; and further comprising the steps of adjusting the weight of the glass gob by a metering device; and utilizing a standard for the glass gob weight detected via an effect of the eddy current losses for regulating the metering device.

* * * * *